Feb. 5, 1952 W. A. GRUENEBERG 2,584,444
VIBRATING INCREMENTAL MOLD CHARGER OR FEEDER
Filed June 3, 1948 5 Sheets-Sheet 1

FIG. 1

INVENTOR.
WALTER A. GRUENEBERG
BY
ATTORNEY

Feb. 5, 1952 W. A. GRUENEBERG 2,584,444
VIBRATING INCREMENTAL MOLD CHARGER OR FEEDER
Filed June 3, 1948 5 Sheets-Sheet 3

INVENTOR.
WALTER A. GRUENEBERG
BY
ATTORNEY

Feb. 5, 1952 W. A. GRUENEBERG 2,584,444
VIBRATING INCREMENTAL MOLD CHARGER OR FEEDER
Filed June 3, 1948 5 Sheets-Sheet 4

INVENTOR.
WALTER A. GRUENEBERG
BY
ATTORNEY

Feb. 5, 1952     W. A. GRUENEBERG     2,584,444
VIBRATING INCREMENTAL MOLD CHARGER OR FEEDER
Filed June 3, 1948     5 Sheets-Sheet 5

INVENTOR.
WALTER A. GRUENEBERG
BY
ATTORNEY

Patented Feb. 5, 1952

2,584,444

UNITED STATES PATENT OFFICE 2,584,444

VIBRATING INCREMENTAL MOLD CHARGER OR FEEDER

Walter A. Grueneberg, Saginaw, Mich., assignor to Jackson & Church Company, Saginaw, Mich., a corporation of Michigan Application June 3, 1948, Serial No. 30,903

7 Claims. (Cl. 198—220)

The present invention relates to a vibrating incremental mold charger or feeder which is particularly but not exclusively adapted for feeding an aggregate of concrete, or sand and lime, or the like, into a mold box.

In the relatively high speed mass production of structural building blocks or bricks from a mix of concrete, or sand and lime, or similar aggregates, it is common to pour the mix by gravity from a feed hopper into an open top cored mold box to shape the brick or block.

An example of one form of block molding machine for which the mold charger or feeding means of the present invention is particularly adapted is described in my co-pending application Serial No. 688,118, filed July 29, 1946. This machine comprises an intermittently rotatable table adapted for progressively indexing a plurality of circumferentially spaced open top mold boxes through a progressive series of work stations. The table pauses after each incremental indexing movement with one of each of the mold boxes indexed at one of each of the work stations, whereat the work operation characteristic of the station is performed. Thus, after the machine has been in operation for a period sufficient to carry one mold box through all of the progressive work operations, one of the empty mold boxes carried by the table will be filled with mix at a feeding station and a completely molded block will be discharged from the machine at the final work station during each incremental indexing cycle.

The mix, although moist, is preferably fed to the mold box in a comparatively dry state and is frequently known as a "dry" mix to distinguish from the relatively fluid sludge state commonly employed in the laying of concrete in ordinary on-the-job construction work. In the "dry" state, the mix pours slowly and tends to pile up on the mold cores and to bridge small cavities within the mold, leaving air pockets and otherwise rendering difficult the complete filling of the mold adjacent the sides and ends thereof. In order to facilitate the flow of the dry mix from the feed hopper and into all parts of the mold, it is common to vibrate the hopper and mold during the feeding operation.

Prior to the present invention, the duration of the feeding operation was determined by mechanical feed control means, such as a sliding gate or cut-off knife adapted to cover the open top of the mold box and to cut off the supply of mix from the feed hopper. A characteristic difficulty with such mechanical feed control means is the time required for its complete opening and closing. For example, with a horizontally slidable gate adapted to move between a cover position and an open position across the open top of the mold box, the open top of the mold box is exposed to receive the incoming mix through an opening which gradually increases from one side thereof as the gate moves from the closed to the open position. Since the mix under vibration will flow readily vertically, but slowly laterally, the complete filling of the mold box is not readily accomplished until the sliding gate completely exposes the open top of the mold to the incoming mix. The gate must remain in the open position until the portion of the mold box is filled which is directly below the top opening thereof and which is the last to be exposed to the incoming mix. Thereafter, the gate begins to move to the closed or cut-off position.

In the modern high speed mass production of molded building bricks or blocks, it is frequently found that with certain desired types of molds, the clearance between the sides thereof and the mold cores is not sufficient to permit complete filling of the mold during the time interval available to obtain maximum production from the machine. Furthermore, the frequent opening and closing of the mechanical feed control means against the heavy mass of mix at the rate of twelve to fifteen times per minute results in rapid wear of the moving parts and costly upkeep.

Accordingly, an object of the present invention is to provide an improved, simplified and efficient feed control means for a moldable mix, which rapidly supplies the mix directly to the open top of a mold box as desired without the requirement of a sliding gate or comparable mechanical cut-off mechanism, thereby minimizing maintenance and replacement expenses.

Another object of the present invention is to provide a feed control means comprising a selectively vibrating grating, which permits the passage of the mix through the grating by gravity flow while the latter is vibrating, and which retains the mix by friction above the grating while the latter is quiescent, and which permits a ready control over the duration and rate of flow of the mix merely by controlling the duration of the vibration period and the rate and amplitude of vibration.

Another object is to provide a feed control means of the character described which is adapted to serve as an overhead feeder for high speed brick and block molding machines, whereby empty mold boxes are progressively indexed at a feeding station below the feed control means and filled with mix in an appreciably less time than is required for other operations in the manufacture of the brick or block, thereby permitting the production speed of the machine to be varied as desired within its operative limits without altering the time allotted to the feeding operation.

Another object of the present invention is to provide an improved high speed feed control means adapted to feed a moldable mix to an open top mold box and to assure a complete filling of the mold box and a rapid thorough distribution of the mix to all parts of the mold box as required, around the cores and to the edges thereof, thereby preventing a pile-up of mix over the cores, and permitting an increased production in the manufacture of a well-formed molded unit.

Other objects of this invention will appear in the following description and appended claims, reference being had to the accompanying drawings forming a part of this specification wherein like reference characters designate corresponding parts in the several views.

The above and other objects are accomplished in a preferred embodiment of the present invention which comprises a vibrating distributor having a grating disposed over the open top of the mold box to be filled. The openings of the grating are adapted in size to permit a ready gravity flow of mix therethrough upon vibration of the grating. Upon cessation of the vibration, friction between the mix and the grating effectively stops the gravity flow. The openings of the grating are preferably disposed over the mold box so as to feed the mix where desired in accordance with the disposition of the mold cavities to be filled.

Vibration of the distributor is preferably effected by electromagnetic means which afford a ready control over the duration of the vibration period and also over the rate and amplitude of vibration. These in turn determine the duration of the feeding period and the rate of flow of the mix through the distributor grating. However, the many advantages of the present invention are not dependent upon electromagnetic vibration means. Other suitable vibrators may be employed where desired.

The mix is fed to the distributor by gravity flow from a vibrating mix receiving tray in communication with a mix supply hopper. The bottom of the mix receiving tray comprises an inclined chute, having an open discharge edge over the distributor, and declines from a position below the discharge opening of the supply hopper to said discharge edge. Likewise, the mix receiving tray is operatively coupled with the vibrator mechanism of the distributor for vibration therewith and feeds the mix from the supply hopper along the declined tray bottom to the discharge edge of the latter when the vibrator mechanism is operating. The angle of decline of the tray bottom is insufficient to permit gravity flow of the mix when the vibrator is quiescent.

Where desired, a plurality of pyramidal guides are provided by the distributor grating between the openings thereof. The apices of the pyramidal guides are below the discharge edge of the mix receiving tray bottom and their sides lead to the edges of the grate openings so as to guide the mix thereto. By suitably locating the apices of the pyramidal guides and determining the angles of inclination of their sides, the distribution of the mix to the various grate openings may be proportioned in accordance with the requirements of the mold box therebelow. Similarly, pyramidal guides or deflectors are provided below the distributor grating and directly over the cores of the mold box to deflect the flow of mix where desired around the cores. Thus a piling up of mix on the cores is avoided and the mix is guided to every part of the mold where desired.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
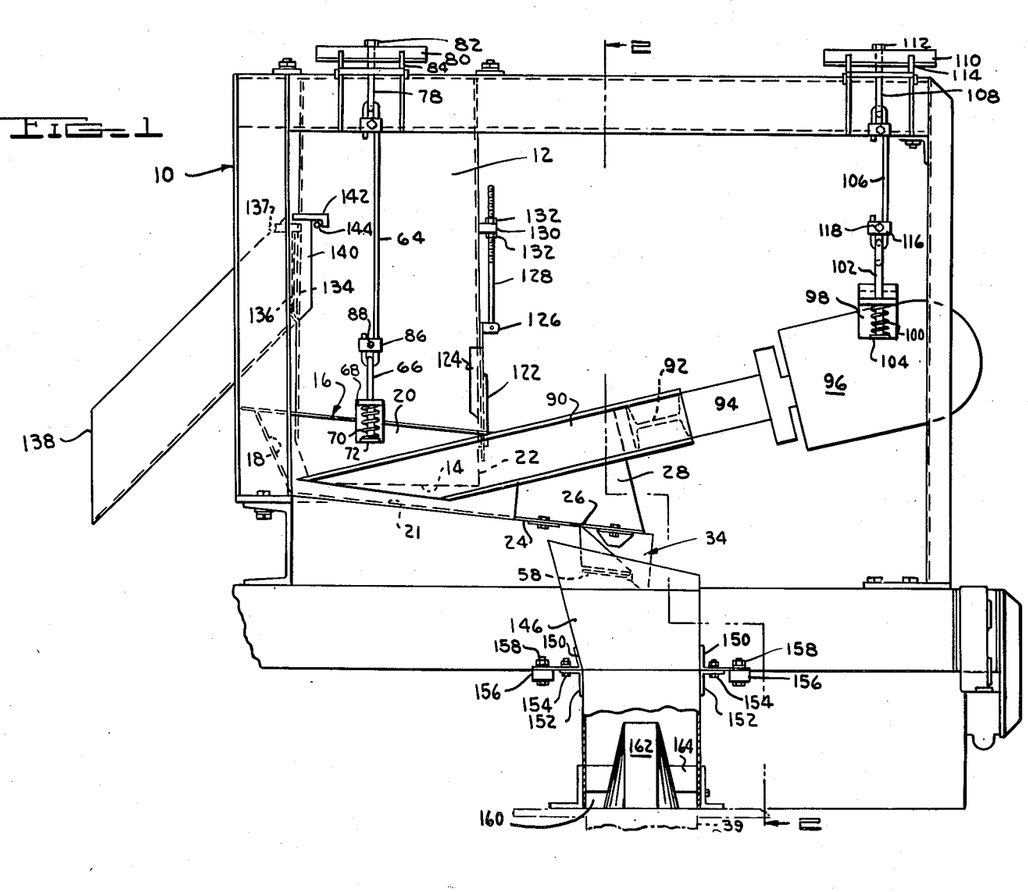
Fig. 1 is a fragmentary side elevation of an incremental vibrating feeding mechanism embodying the present invention.
Figure 2:
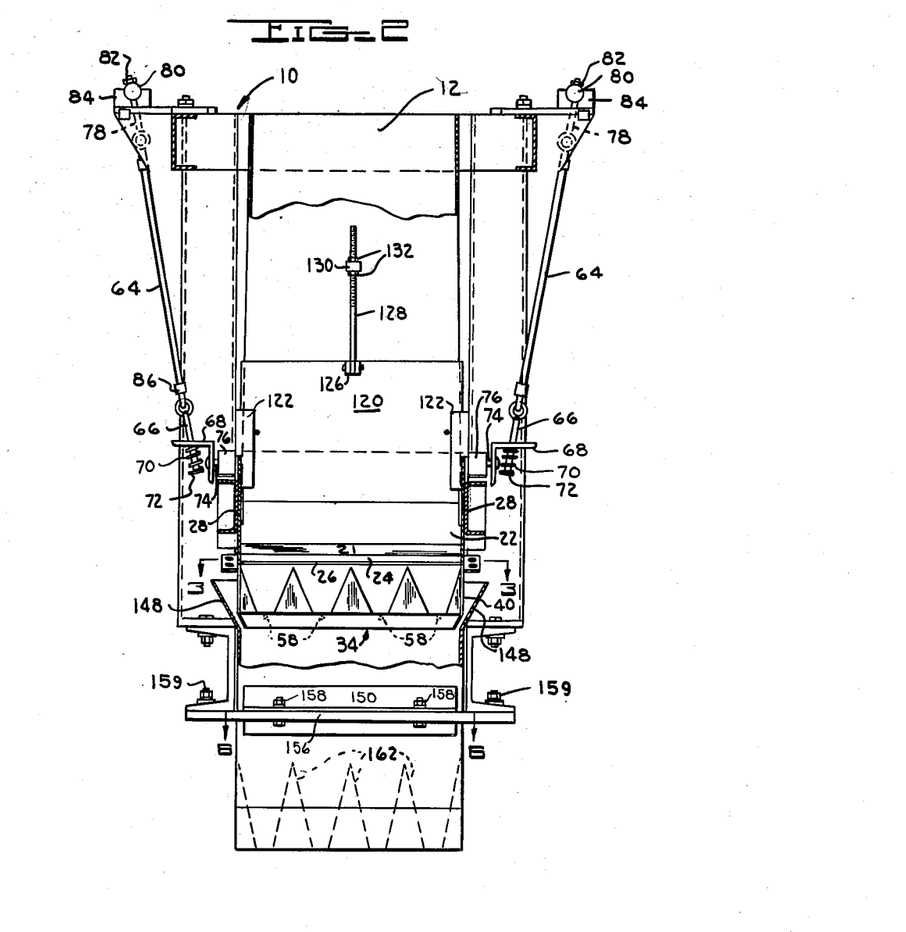
Fig. 2 is a fragmentary vertical section taken in the direction of the arrows essentially along the broken line 2—2 of Fig. 1.

A particular embodiment of the present invention is shown by way of example in the drawings wherein a structural steel framework, indicated generally by the numeral 10, Figs. 1 and 2, supports the vertical feed hopper 12 having the lower open discharge end 14 adapted to deliver a plastic moldable mix to the three-sided mix receiving vibrating tray, indicated generally by the numeral 16. The latter is supported independently of the hopper 12 by means discussed below, so as to facilitate vibration of the tray 16 without necessitating vibration of the entire weight of the hopper 12 and mix therein.

In the present instance, the backside 18 and two lateral sides 20 of the tray 16 extend upward around the lower hopper opening 14. The bottom 21 of the tray 16 declines from the back edge 18 toward the open side 22 of the tray 16 at the forward portion thereof, i. e., at the right in Fig. 1. An extension base plate 24 in the plane of the tray bottom 21 provides a forward continuation of the latter and terminates at the forward discharge edge 26, Figs. 1, 2 and 3. Vertical lateral side plates 28 extend upward from the extension plate 24, and comprises forward continuations of the side plates 20. Means for intermittently vibrating the tray 16 are described more fully below. The decline of the tray bottom 21—24 is sufficient to permit a gravity flow of mix to the discharge edge 26 when the tray 16 is vibrating, but not to permit a flow of the mix when the tray is quiescent.

Figure 3:
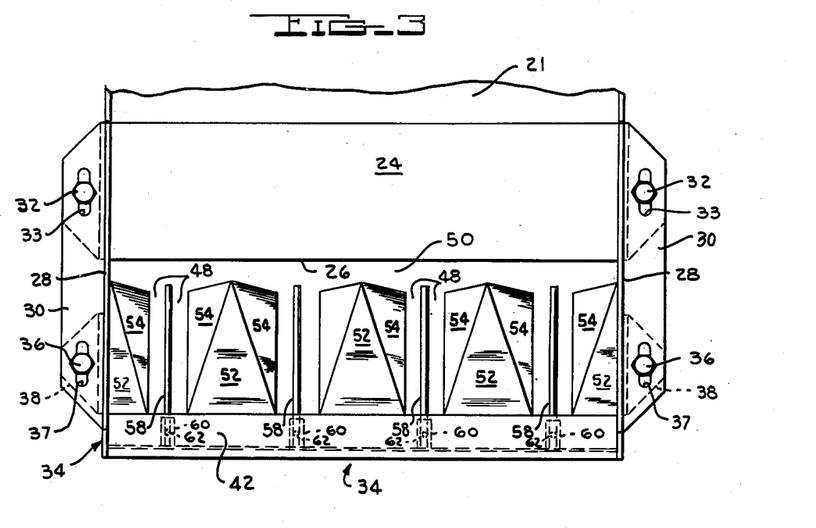
Fig. 3 is a fragmentary enlarged horizontal section taken in the direction of the arrows essentially along the line 3—3 of Fig. 2, showing a plan view of the distributor.
Figure 4:
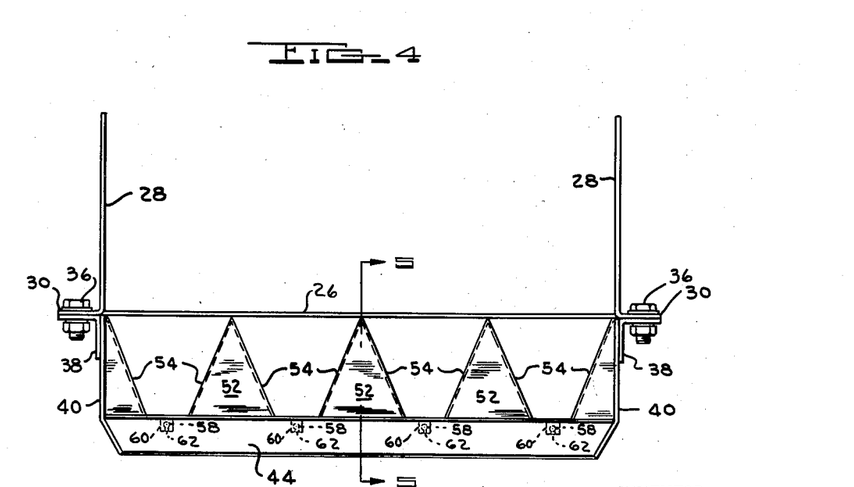
Fig. 4 is essentially a front elevation of the distributor shown in Fig. 3.

Extending laterally from the base of each extension side plate 28 is the bottom ledge 30, Figs. 3 and 4, which is adjustably secured to the opposite lateral edges of the extension base plate 24 by the bolts 32 within the elongated adjusting slots 33 provided by each ledge 30. The ledges 30 also provide support for the distributor assembly, indicated generally by the numeral 34, being adjustably secured to the angle brackets 38 at the lateral edges of the latter by the bolts 36 extending through the elongated adjusting slots 37 within the ledges 30. The angel brackets 38 are welded to the essentially triangular vertical side plates 40 of the distributor assembly 34, Fig. 4, which in turn are welded at their lower forward portions to the transverse spacer members comprising the horizontal supporting plate 42 and the vertical supporting plate 44, Figs. 3, 4 and 5.

The distributor assembly 34 provides a grating for selectively metering the mix to the open top of a mold box 39, indicated in phantom, Fig. 1, upon vibration of the grating. In the present instance, the latter comprises a plurality of space pyramidal deflectors, Figs. 3, 4 and 5, having their apices at approximately the level of or slightly below the discharge edge 26. The rectangular base and triangular rearward face 47 of each pyramidal deflector are open to minimize the overall weight of the distributor 34. Although the latter should be of rigid construction, it is important that the distributor 34 should be as light as possible in order to minimize its effect on the frequency and amplitude of the vibrator mechanism described below. The pyramidal deflectors are spaced laterally by the longitudinal slots 48, Fig. 3, and are adjustably spaced from the discharge edge 26 by the transverse opening 50. The latter is adjustable in width by means of the aforesaid adjustable support for the distributor assembly 34, including the bolts 36 within the slots 37.

The triangular forward guide plate 52 of each pyramidal deflector declines forwardly from its apex toward the base 46 and the horizontal supporting plate 42 to which latter it is welded. The lateral triangular guide plates 54 of each pyramidal deflector decline from the apex to the lateral edges of the base 46, being supported by their respective plate 54. Each pyramidal deflector is also supported from below by the inclined reinforcing bracket 56, Fig. 5, which is welded to the underside of the forward guide plate 52 and to the transverse supporting members 42 and 44.

By selectively determining the angles of inclination of the guide plates 52—54, the rate and amount of flow of the mix toward the various grate slots 48, upon virbation of the distributor assembly 34, may be proportioned as desired and in accordance with the requirements of the mold box 39 below. In the present instance three symmetric or double pyramidal deflectors 52—54 are employed between the four grate slots 48. Each of the two lateral deflectors 52—54 has only one lateral guide plate 54 and one-half of a forward guide plate 52. It will be apparent that deflector means having inclined guide surfaces other than the pyramidal guide plates 52—54 may be employed with the present invention to guide the mix in the desired proportions to the various grate slots 48.

Figure 5:
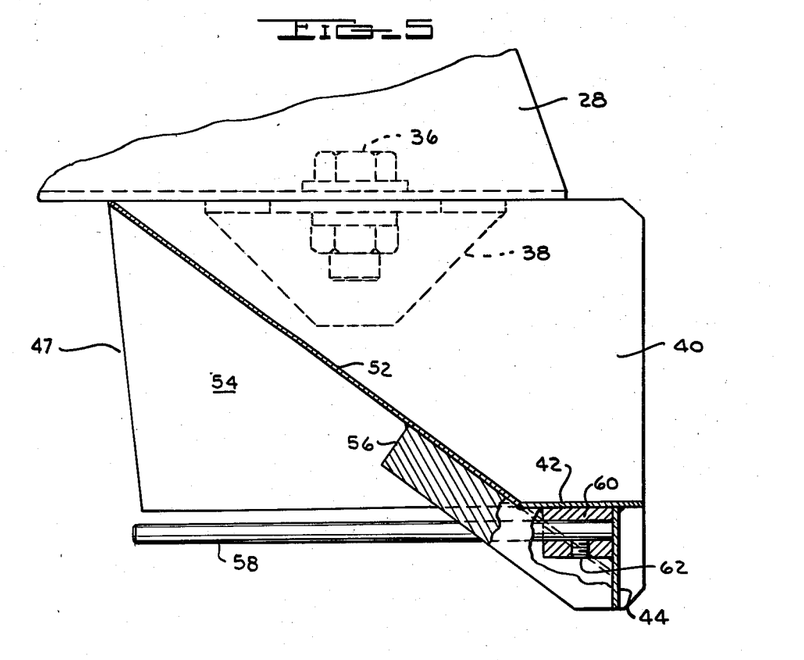
Fig. 5 is a fragmentary enlarged vertical section through the distributor, taken in the direction of the arrows essentially along the line 5—5 of Fig. 4.
Figure 6:
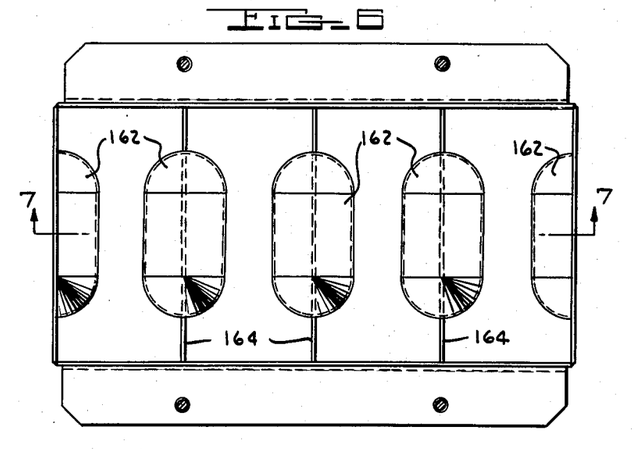
Fig. 6 is an enlarged horizontal section taken in the direction of the arrows along the line 6—6 of Fig. 2, showing a plan view of the pyramidal deflectors above the mold box.
Figure 7:
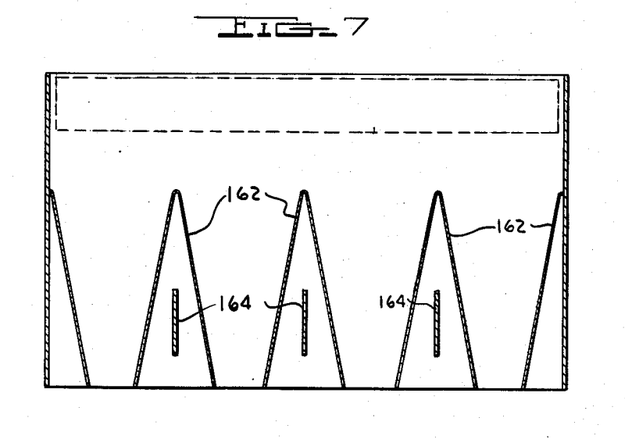
Fig. 7 is a vertical section taken in the direction of the arrows along the line 7—7 of Fig. 6.

In order to serve as a baffle means against which the mix being fed from the tray 16 will pile up when the distributor 34 is not vibrating, each slot 48 is essentially bisected by one of the four longitudinally extending baffle rods 58 which project rearwardly from the supporting sockets 60 therefor and are secured in place by the set screws 62, Fig. 5. Each supporting socket 60 is welded to the underside of the horizontal support 42 and rearwardly of the vertical support 44.

The vibrating mix receiving tray 16 is resiliently supported at its opposite lateral sides from the frame 10 by means of the paired hooked tie rods 64, Fig. 2. The lower end of each tie rod 64 is flexibly hooked within the eye of an eye bolt 66. The leg of the eye bolt 66 extends through an opening therefor within the horizontal face of an angle bracket 68, which latter is resiliently supported by the coil spring 70 around the eye bolt 66 and under compression between the horizontal underface of the angle bracket 68 and the spring retaining flange 72 at the lower extremity of the eye bolt 66. The vertical leg of each angle bracket 68 is secured by a pin 74 to a boss 76, which in turn is secured to and projects laterally from the tray side 20.

The upper end of each hooked tie rod 64 is flexibly hooked within the eye of an upper eye bolt 78 having its leg projected through a cylindrical rocker member 80 and secured in place by the nut 82 screw-threaded on the end of the eye bolt 78. The cylindrical rocker 80 is pivotally supported within a saddle means 84, which in turn is supported from the frame 10. Thus upon vibration of the tray 16, complete freedom of movement thereof relative to the frame 10 is permitted by the pivotal and flexibly linked coupling therebetween. The hook ends of each tie rod 64 are each secured against accidental springing by paired clamping brackets 86 which are drawn together by clamping bolts 88.

Vibration to the tray 16 is transmitted through the paired vibrator arms 90 disposed on the opposite lateral sides of the tray 16 and secured to the side plates 20 and 28. The vibrator arms 90 extend angularly forward and upward to the transverse I-beam 92 joining their forward ends. The beam 92 is secured to the vibrating extension arm 94 of an electromagnetic vibrator within the vibrator housing 96. The latter is resiliently supported similarly to the resilient support for the vibrator tray 16, so that vibration of the housing 96 will not be transmitted to the supporting frame 10. Actuation of the electromagnetic vibrator is readily controlled by an electric control circuit, not shown, which may include a limit switch to initiate the vibration period upon indexing of the mold box 39 to the mold charging position, and time delay relay means to terminate the vibration period after a predetermined time interval.

Although the support for the housing 96 on only one side thereof is shown in Fig. 1, it is to be understood that a similar support is provided on the other side. As may be noted in Fig. 1, the said support on one side of the housing 96 comprises an angle bracket 98 having its vertical face secured to the housing 96 and a horizontal face resiliently supported by the coil spring 100 coiled around the depending leg of an eye bolt 102 which passes through the said horizontal face of the bracket 98. The coil spring 100 is under compression between the horizontal face of the angle bracket 98 and the spring retaining flange 104 at the lower extremity of the eye bolt 102. The lower end of a tie rod 106 is flexibly hooked through the eye of the bolt 102. Similarly, the upper end of the tie rod 106 is flexibly hooked within the eye of an upper eye bolt 108 having its leg extended through a cylindrical rocker 110 and secured in place by a nut 112. The rocker 110 is pivotally mounted within a saddle 114 for pivotal movement as required by the vibrator mechanism. Paired safety clamping brackets 116 and clamping bolts 118 secure the hook ends of each of the tie rods 106 against accidental springing in the manner of the clamping assemblies 86—88.

The volume of flow of the mix from the vibrator tray 16 during vibration is selectively determined by the vertically sliding gate 120 supported at the forward side of the hopper 12 and adapted for adjustably opening or closing across the opening of the open side 22 of the tray 16. The gate 120 is slidably secured between the external forward wall of the hopper 12 and the paired vertical lateral guide members 122, which are spaced from the forward side of the hopper 12 by the lateral brackets 124, Figs. 1 and 2, so as to provide a guide way for the gate 120. One of each of the guides 122 is secured to one of each of the brackets 124. The latter are secured to opposite sides of the hopper 12.

The upper portion of the gate 120 provides the boss 126 secured to the lower end of the vertical screw-threaded gate adjusting shaft 128. The latter extends through an opening provided therefor within the boss 130 secured to the forward side of the hopper 12 and is adjustably secured to the boss 130 by the paired adjusting nuts 132 above and below the boss 130.

At the rear of the hopper 12 is a vertically slidable clean-out door 134 which is normally held by the pressure of mix within the hopper 12 against the paired lateral retaining flanges 136 provided by the rear wall of the hopper 12. A horizontal handle bar 137 at the upper portion of the clean-out door 134 permits raising of the latter so as to open the hopper to the cleanout chute 138. The lateral edges 140 of the chute 138 lie adjacent and externally to the lateral edges of the hopper 12, permitting the chute 138 to be readily detachably secured to the hopper 12 by means of the lateral hooks 142 secured to the upper forward portion of the edges 140 and adapted for hooking over the laterally projecting studs 144 secured to the sides of the hopper 12.

By the above construction, upon actuation of the electromagnetic vibrator, the vibrator arms 90, tray 16, and the extensions thereof comprising the plates 24 and 28, together with the distributor assembly 34, will vibrate as a unit. By thus vibrating, mix supplied to the tray 16 from the hopper 12 will be caused to flow along the decline of the tray bottom 21 and extension plate 24 to the discharge edge 26, and from thence through the grate openings 48 and 50. By suitably selecting the width of the openings 48 and 50, the mix will pile up on the baffle rods 58 upon cessation of the vibration, thereby effecting a sharp cut-off for the flow of mix through the distributor grating.

It has been found that grate slots 48 of approximately one and five-sixteenths inches in width and bisected by an approximately three-sixteenths inch diameter baffle rod 58 is satisfactory for most "dry" mixes used in the manufacture of conventional bricks or blocks. With such dimensions, a ready flow of the mix through the distributor grating is achieved while the latter is vibrating, and an efficient complete shut-off of the flow of mix is effected immediately upon cessation of the vibration. These dimensions, however, may be varied to meet particular requirements.

The mix which flows through the distributor grating is received by the open upper end of the lower chute 146, Fig. 1, having the flared upper sides 148 around the lower portion of the distributor 34, Fig. 2. The chute 146 is suitably supported from the frame 10, as for example by angle brackets 150 and 152 welded to the side walls of the chute 146 and bolted together by the bolts 154. As noted in Fig. 1, the horizontal face of each angle bracket 150 is secured to the transverse supporting member 156 by the bolts 158. The transverse supporting member 156 in turn is secured to the frame 10 by the bolts 159.

The open lower end 160 of the chute 146 is supported directly over the open end of the mold box 39, Fig. 1, and provides the plurality of pyramidal deflectors 162, which are selectively disposed over the mold box opening for guiding the mix to the mold box 39 as desired and to prevent a piling up of the mix on the cores within the mold box 39. In the present instance, three complete pyramidal deflectors 162 are each mounted on one of each of the three transverse cross braces 164, which extend centrally through the deflectors 162 and are welded at their opposite ends to the sides of the chute 146. The two lateral deflectors 162 are welded to the lateral sides of the chute 146 and, as shown, are each equivalent to one-half of one of the three central deflectors 162.

In operation of the feeding unit described, a suitable mix within the hopper 12 is fed by gravity to the vibrator tray 16. Upon each intermittent vibration period of the vibrator mechanism, the mix flows through the tray opening 22, which is selectively regulated by the adjustable gate 120 so as to permit a desired flow of mix to the distributor 34 during the vibration period.

Also during each vibration period, the mix caused to flow off the discharge edge 26 strikes the guide plates 52, 54 and is thereby guided to the grate slots 48. By selectively adjusting the horizontal width of the slot 50 and by properly determining the angles of the plates 52, 54, the proportion of the mix which is fed to any portion of the grating may be predetermined so as to properly distribute the flow of the mix into the vertical chute 146 as required for uniformly filling the mold box 39 in a minimum time.

Thus the mix may be fed at a maximum rate to portions of the mold 39 having larger cavities to be filled. Similarly, the deflectors 162 direct the flowing mix where desired into the mold 39 and provide a final guide means to assure a proper distribution of the mix to the various parts of the mold 39. Overfilling of some portions of the mold 39 and underfilling other portions thereof, and a piling-up of the mix on the cores within the mold box are thus avoided. Likewise, the efficient distribution of the mix simultaneously to all parts of the mold box, and at a rate of flow which varies proportionately over the surface of the mold box 39 in accordance with the variation in the volume of the mold cavity below the surface, assures complete charging of the mold in a minimum time interval. It has been possible by means of the present invention to reduce the charging time for a 12-inch mold to about one and one-quarter seconds. A charging time of two and one-half to three seconds has been achieved for the larger blocks of the size of the conventional so-called sand lime blocks (approximately 8"x12"x16").

In the use of the present invention with continuous high speed brick or block molding machines, it is common to index a plurality of empty mold boxes successively to a mold filling station, whereat the mold boxes are filled with mix in their turn. Thereafter the filled mold boxes are carried through a progressive series of work stations by intermittent indexing movements for completion of the molding process, each mold box being progressively indexed in its turn at each work station. In such machines, the plurality of mold boxes move as a unit pausing between each indexing movement for the time interval required by the work operation, and with a mold box indexed at each work station. With one such machine, a maximum rate of production for blocks of the size of the aforesaid cinder blocks is approximately twelve per minute, or one completed block from the final operation every five seconds, permitting a maximum time of approximately five seconds per block at any one work station, as for example the mold filling station. It has been found that about twenty-five per cent of the maximum allotted time for each work station is required for indexing and for operation of the control mechanisms, leaving approximately three and one-quarter seconds work time for each mold box at each indexed position. As each mold is indexed to the filling station, supply of electrical current to the electric vibrator is controlled by any conventional type of desired electrical control circuit. Such a circuit may, if desired, include a conventional time delay relay means to predetermine the duration of the vibration period, and accordingly the feed period. Since only two and one-half to three seconds are required to fill the mold, depending upon the type of mix being used, the vibration period for any specific mix may remain constant regardless of the rate at which blocks are produced. Thus for any one type of mix the production rate of the machine may be varied at will without requiring an alteration of the feeding period.

By the foregoing, I have disclosed an improved efficient, and simplified mold feeding or charging apparatus adapted for operation with high speed molding machinery. The feeding period is readily subject to automatic control and may be efficiently started and stopped by controlling the vibration of an electromagnetic vibrator mechanism, thereby eliminating a moving gate and its consequent time delay in opening and closing and the expensive maintenance of wearing parts, and also readily permitting a distribution of the molding mix to all parts of the mold box simultaneously throughout the feeding period.

Having thus described my invention, I claim:

1. In an apparatus for charging an open mold with a moldable mix, the combination of a vibrating tray adapted to receive said mix and to discharge the mix off one edge thereof upon vibration thereof, means for intermittently vibrating said tray and distributor means disposed below the discharge edge of said tray for receiving the mix therefrom and for distributing the mix as and where required to the open mold and comprising a vibrating grating adapted for vibration with said tray and having openings of a size sufficient to permit passage of said mix only during the vibration of said grating and pyramidal deflector means positioned above said grating and adapted to direct said mix into the openings in said grating, the discharge edge of said tray being disposed immediately above the apices of said pyramidal deflector means.

2. The combination as claimed in claim 1 and being further characterized in that said vibrating tray is three-sided and open at its discharge edge, and the bottom of the tray is inclined downward toward the discharge edge.

3. The combination as claimed in claim 2 and being further characterized in that a feed hopper adapted for discharging into said tray is provided, and an adjustable gate means is provided for selectively controlling the flow of mix to the discharge edge of said tray.

4. In a vibrating mold charger adapted for charging an open top mold from above with a moldable mix, the combination of a vibrating three-sided mix receiving tray having an open discharge edge and having a bottom inclined toward said discharge edge, a feed hopper for feeding said mix to said tray, means to effect an intermittent flow of mix along the inclined bottom of said tray to the discharge edge thereof and comprising selectively controlled vibrator means operatively connected with said tray for intermittent vibration thereof, and distributor means disposed below the discharge edge of said tray for receiving the mix therefrom and for distributing the mix as required to a mold disposed below said distributor and comprising a vibrating grating adapted for vibration with said tray, the openings of said gratings being adapted in size to permit passage of said mix only upon vibration of said grating and pyramidal deflector means positioned above said grating and adapted to direct said mix into the openings in said grating, the discharge edge of said tray being disposed immediately above the apices of said pyramidal deflector means.

5. The combination as claimed in claim 4 and being further characterized in that a second pyramidal deflector means is provided above said open mold for directing the mix received from said grating into said open mold.

6. An apparatus for charging an open top mold box with a moldable mix and comprising distributor means for distributing a moldable mix in a mold box, said distributor means including a vibrating grating having openings adapted to permit passage of the moldable mix only upon vibration of said grating, controlled means for selectively vibrating said grating, selected grate openings for said distributor comprising longitudinal slots, and a longitudinal baffle bar carried by said distributor for vibrating therewith centrally disposed longitudinally within each of said longitudinal slots.

7. An apparatus for charging an open top mold box with a moldable mix and comprising distributing means for distributing a moldable mix in a mold box, said distributor means including a vibrating grating having openings adapted to permit passage of the moldable mix only upon vibration of said grating, said vibrating grating including pyramidal deflector means mounted in the path of the moldable mix and between the openings thereof to meter and guide the mix into said openings, and a second pyramidal deflector means positioned above said open mold box and below said grating for directing the mix received from said grating into said open mold box.

WALTER A. GRUENEBERG.

REFERENCES CITED

The following references are of record in the file of this patent:

UNITED STATES PATENTS

| Number | Name | Date |
|---|---|---|
| 83,096 | Richards et al. | Oct. 13, 1868 |
| 225,564 | Case et al. | Mar. 16, 1880 |
| 474,777 | Keith | May 10, 1892 |
| 749,022 | Brough | Jan. 5, 1904 |
| 1,191,227 | Ramsay | July 18, 1916 |
| 1,594,310 | Long | July 27, 1926 |
| 1,727,580 | White | Sept. 10, 1929 |
| 1,835,914 | Stockdale | Dec. 8, 1931 |
| 1,846,668 | Barber | Feb. 23, 1932 |
| 1,905,619 | Carton | Apr. 25, 1933 |
| 1,990,634 | Brown | Feb. 12, 1935 |
| 2,517,903 | Luhrmann | Aug. 8, 1950 |

FOREIGN PATENTS

| Number | Country | Date |
|---|---|---|
| 640,139 | Germany | Dec. 23, 1936 |